(12) United States Patent
Kiilerich et al.

(10) Patent No.: US 9,043,276 B2
(45) Date of Patent: May 26, 2015

(54) PACKAGING AND BULK TRANSFER OF FILES AND METADATA FOR SYNCHRONIZATION

(75) Inventors: Dennis Kiilerich, Seattle, WA (US); Jordan B. Naftolin, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1152 days.

(21) Appl. No.: 12/245,683

(22) Filed: Oct. 3, 2008

(65) Prior Publication Data

US 2010/0088297 A1 Apr. 8, 2010

(51) Int. Cl.
*G06F 17/30* (2006.01)
*H04L 29/08* (2006.01)

(52) U.S. Cl.
CPC ............ *H04L 67/06* (2013.01); *H04L 67/1095* (2013.01); *H04L 67/04* (2013.01)

(58) Field of Classification Search
CPC .................................................. G06F 17/30566
USPC .......................... 707/602, 610, 621, 624, 638
See application file for complete search history.

(56) References Cited

U.S. PATENT DOCUMENTS

| | | | |
|---|---|---|---|
| 6,834,083 B1 | 12/2004 | Tahara et al. | |
| 7,016,967 B2 | 3/2006 | Mori et al. | |
| 7,035,878 B1 | 4/2006 | Multer et al. | |
| 2004/0064481 A1* | 4/2004 | Azami | 707/621 |
| 2005/0108365 A1 | 5/2005 | Becker et al. | |
| 2005/0276570 A1* | 12/2005 | Reed et al. | 386/46 |
| 2006/0062389 A1* | 3/2006 | Mukherjee et al. | 380/256 |
| 2007/0005795 A1* | 1/2007 | Gonzalez | 709/232 |
| 2007/0043874 A1 | 2/2007 | Nath et al. | |
| 2007/0276951 A1 | 11/2007 | Riggs et al. | |
| 2008/0016201 A1 | 1/2008 | Thompson | |
| 2008/0016239 A1 | 1/2008 | Miller et al. | |
| 2008/0119953 A1* | 5/2008 | Reed et al. | 700/94 |
| 2008/0267217 A1* | 10/2008 | Colville et al. | 370/477 |
| 2008/0275905 A1* | 11/2008 | Hannuksela | 707/610 |
| 2009/0254578 A1* | 10/2009 | Hall | 707/610 |
| 2011/0107214 A1* | 5/2011 | Kouznetsov et al. | 715/716 |

FOREIGN PATENT DOCUMENTS

EP 1814268 A1 8/2007

OTHER PUBLICATIONS

Bruce Devlin, "The Material Exchange," Snell 7 Wilcox, 1999, pp. 1-6.*
"H321 Bulk File Transfer (BFX) for HP-UX Systems", Retrieved at <<http://www.netexsw.com/nesi/support/mtus/mtu-h321-01.pdf>>, Jun. 7, 2000, pp. 19.

* cited by examiner

*Primary Examiner* — Alicia Willoughby
*Assistant Examiner* — Alexandria Bromell
(74) *Attorney, Agent, or Firm* — Bryan Webster; Kate Drakos; Micky Minhas

(57) ABSTRACT

An arrangement for packaging and transferring files such as content items and metadata in synchronization operations. Files are packaged in a concatenated fashion in order to optimize usage of the transfer channel, while maintaining an ability to keep track of how many files have been transferred. Metadata associated with the files may be sent in a single package in advance of sending the files. The metadata may be compressed using both a custom mechanism that takes into account predictable commonalities inherent in metadata for multimedia files, as well as standard compression techniques.

12 Claims, 13 Drawing Sheets

PACKAGING AND BULK TRANSFER OF FILES AND METADATA FOR SYNCHRONIZATION

BACKGROUND

As digital media technology improves and the price of storage decreases, users increasingly host collections of digital media (for example, audio, video, images, graphics, and like) on their personal computers and/or network-based data storage services. But users often desire for their digital media collections to be portable. More and more, users seek to transfer all or some of their collections to portable devices. Examples of portable devices include but are not limited to personal media players, personal digital assistants, phones, portable computers, in-vehicle devices, and other devices.

With the advent of relatively high-capacity storage on portable devices, users can store large quantities of media content on their portable devices. The process of transferring media files between a host computer and a portable device is termed synchronization. For example, the media transfer protocol (MTP) may be combined with the AutoSync® functionality of Windows Media Player® to accomplish synchronization.

Synchronization is often performed using a wired connection between a portable device and a host computer. For example, in the most common implementation of MP3 players and other related digital media playback devices, the content is placed on the device using a wired USB or "Firewire" IEEE 1394 cable. Certain devices have also implemented wireless data transfer methods using 802.11 "WiFi" connections or Bluetooth. For example, some portable devices allow wireless communication between multiple portable devices or between the device and a web-based service.

Some transport techniques used in synchronization, e.g., USB, have optimized modes for transferring in bulk. Sending multiple files of arbitrary, e.g., non-aligned, size causes inefficiency because of, e.g., partially-filled blocks. Inefficiencies also arise because multiple switches in protocol, from bulk to non-bulk and vice-versa, require multiple commands to be sent, indicating that a new file and accompanying metadata are being sent. In addition, using ordinary compression algorithms on bulk files may be disadvantageous since the recipient generally cannot interpret the data until all of the data is received, and in the case of a disconnection, the transferred data cannot be used and in general the file must be re-sent.

SUMMARY

The present arrangement packages and transfers files, e.g., content items and metadata, in a synchronization or other operation in an optimized way. The files are organized in a sequential fashion, e.g., concatenated. A count is kept on the sender, e.g., host computer, side and on the recipient, e.g., portable device, side. For example, a content revision number is maintained on the host computer side which is related to the number of files sent, the number of bytes sent, or by another like measure. A similar content revision number is maintained on the portable device side to keep track of the files received. As files are sent and received, these numbers may be changed, e.g., incremented. In this way, the sender knows how many files have been sent and the recipient knows how many files have been received. If the synchronization relationship is severed in the middle of a transfer, e.g., the connection is lost, then upon reconnection, the content revision number on the host computer side may be compared to the content revision number on the portable device side. If they match, files can continue to be transferred starting from the point where the disconnection happened. If the content revision numbers do not match, then a query may be sent from the host computer to the portable device to determine what files are missing. The missing files may be sent and the operation may continue until completion. By concatenating the files and keeping track of a content revision number, a synchronization operation can proceed and each side can keep track of the synchronization progress without having to communicate beyond the initial content revision number comparison.

In some arrangements, metadata associated with the content items may be combined and packaged separately, e.g., before content items are transferred. The metadata itself may be compressed. The metadata compression may be of a standard type or it may be of a custom type, which automatically takes into account metadata patterns inherent in multimedia files. A combination of both types of compression may also be employed. Finally, subsequent compression may be used to further reduce the resulting metadata, this subsequent compression removing common patterns in the metadata, across metadata properties.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

Corresponding reference characters indicate corresponding parts throughout the drawings.

DETAILED DESCRIPTION

Figure 1:
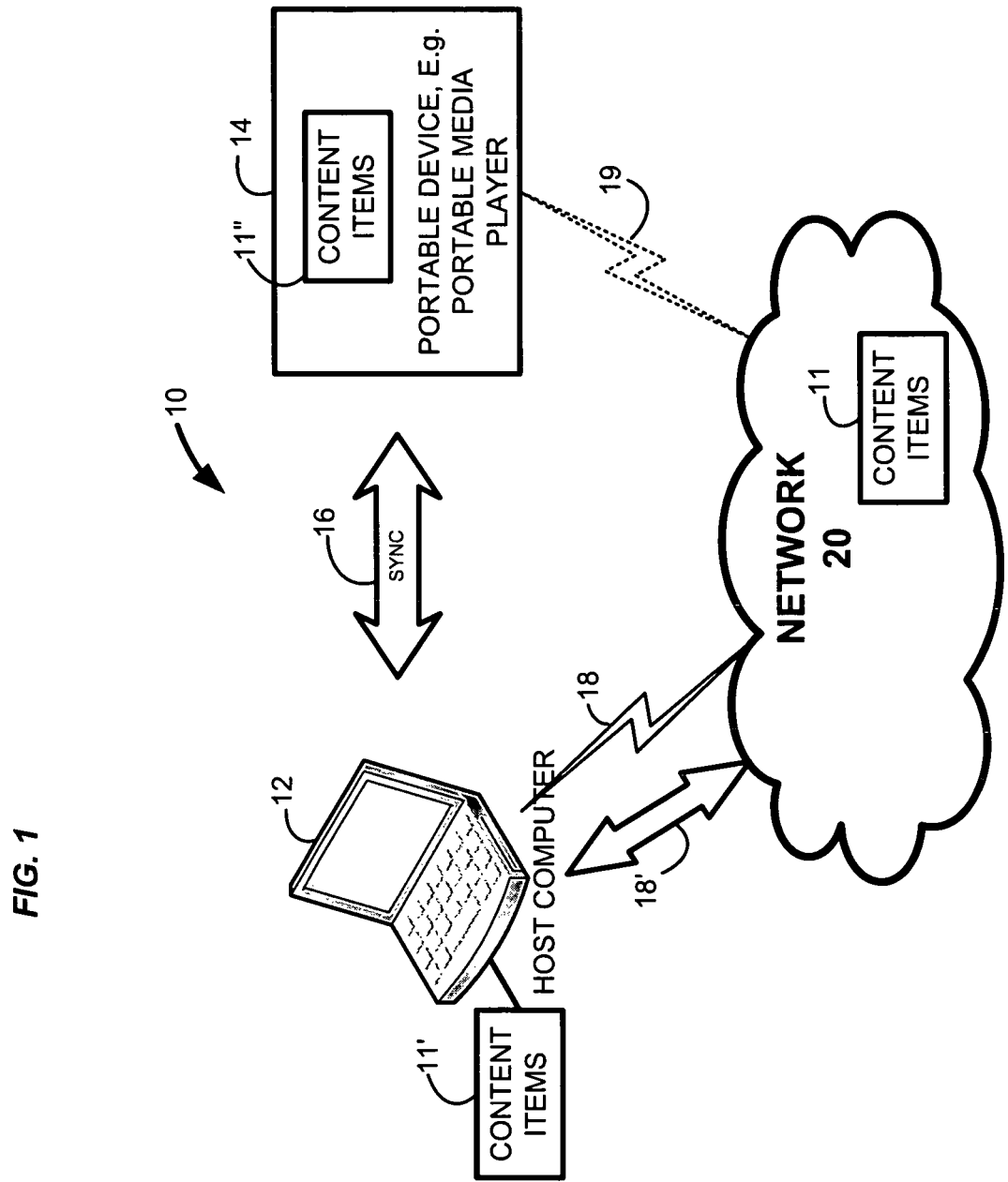
FIG. 1 shows a portable device that is operatively coupled to a host computer such as a host computer and where the host computer is connected to a media content delivery service via a network such as the Internet.

Arrangements are provided for packaging and transferring files and metadata between a host computer and a portable device for synchronization operations. Files are packaged in a concatenated fashion to optimize usage of the transfer channel, and are counted when sent and when received to know how many files have been transferred. Metadata associated with the files may be sent in a single package in advance of sending the files. The metadata may be compressed using both a custom mechanism that takes into account predictable commonalities inherent in metadata for multimedia files, as well as standard compression techniques.

The following terms and definitions are provided as an initial matter.

"Content items" (elements 11, 11', and 11" in FIGS. 1 and 2 and as shown in FIGS. 6, 8, 10, and 12 and discussed further below), "items of content", or just "content" represent any known or later-developed commercial or non-commercial stored digital content (for example, files corresponding to audio, video, images, graphics, text, playlists, and the like) in any known or later-developed format. Content items may also include episodic content, such as podcasts, made up of individual content files and/or an RSS-standard XML file that defines the series and the context, order, and description of the content of the related episodes. Content items may be protected by one or more enforceable intellectual property rights of one or more third parties, such as copyrights, patent rights, trademark rights, or trade secret rights. It is to be appreciated and understood that content items can be embodied on any suitable computer-readable medium.

A "portable device", "portable client device", or "second device" (element 14 shown in FIGS. 1, 2, 6, 8, and 10 and discussed further below) is any device that can store and/or render content items. Some ability to manage the content items stored thereon may be accorded, such as the ability to delete a content item or to add to or modify a playlist. However, in many cases, such functionality is minimal as users prefer to manage their content on a device where the content items may be more easily visualized, such as a "host computer" described below. An exemplary portable device is a portable and/or in-vehicle media player, phone, personal digital assistant, and the like. A portable device may also be, however, any variety of computing device.

A "host computer", "content management device", or "first device" (such as element 12 shown in FIGS. 1, 4, and 7 and discussed further below) is any device with functionality to enumerate and/or manage content items. A host computer may also generally render content items. While an exemplary host computer discussed here is a personal computer, the arrangement may be employed with any computing device, such as desktop computers, servers, laptop or notebook computers, handheld computers, personal digital assistants, smartphones, mobile phones, tablet computers, mainframe computers, and the like.

"Synchronization" (such as via link 16 in FIGS. 1,2, 6, 8, and 10 and discussed further below), refers to the act of making two sets of content items on each of two different devices, such as a host computer and a portable device, correspond to each other. The two sets need not be identical; rather, the correspondence is generally to add or delete content items on both, or to manage content items on both. In many cases, content is managed on a host computer and the managed content is periodically synchronized with a portable device that a user carries as part of the user's daily routine. In many cases, host computers can store much more information than portable devices, and thus it is a subset of content items on a host computer that is synchronized with a portable device. Host computers may also synchronize with other host computers. Moreover, a user may synchronize content downloaded from an online service to a mobile phone, and then synchronize the mobile phone to another host computer. Synchronization may be partial; that is, only a portion of the content on one device may be synchronized to another device. This may occur, e.g., when only certain playlists are synchronized or where a user interrupted the synchronization (or the connection was lost) before the synchronization was completed. One implementation of the arrangements described below addresses and remedies or mitigates this situation. The synchronization procedure may be automatic or manual. While the term "synchronization" refers to data and information flowing in both directions between a host computer and a portable device, the term often relates to simply downloading items from a host computer to a portable device.

FIG. 1 shows an arrangement 10 which includes a host computer 12 coupled to a portable device 14 as well as to a network 20. The connection between the host computer 12 and the network 20 may be by way of a wireless connection 18 or a wired connection 18', and the portable device 14 may also have means 19 to connect wirelessly to a network.

The host computer 12 and portable device 14 have a synchronization relationship 16 with each other, and the synchronization relationship may be enabled by a wired or wireless connection. A wired connection may be by way of a connection cable coupled to an input port such as a USB port (Universal Serial Bus). Other arrangements may also be used to implement communications between the portable device and host computer 30 including, for example, those employing wireless protocols.

The synchronization relationship implemented between the host computer 12 and the portable device 14 typically enables media content items 11 such as music, video, images, games, information, and other data to be downloaded from an on-line source over a network 20 such as the Internet to the host computer 12 where they are stored as a library of media content items 11'. A synchronization procedure allows the same (or a subset) to be transferred and additionally stored as content items 11" on the portable device 14. In some cases, content items may be downloaded directly onto the portable device, especially if the portable device includes a wireless communications capability.

Figure 2:
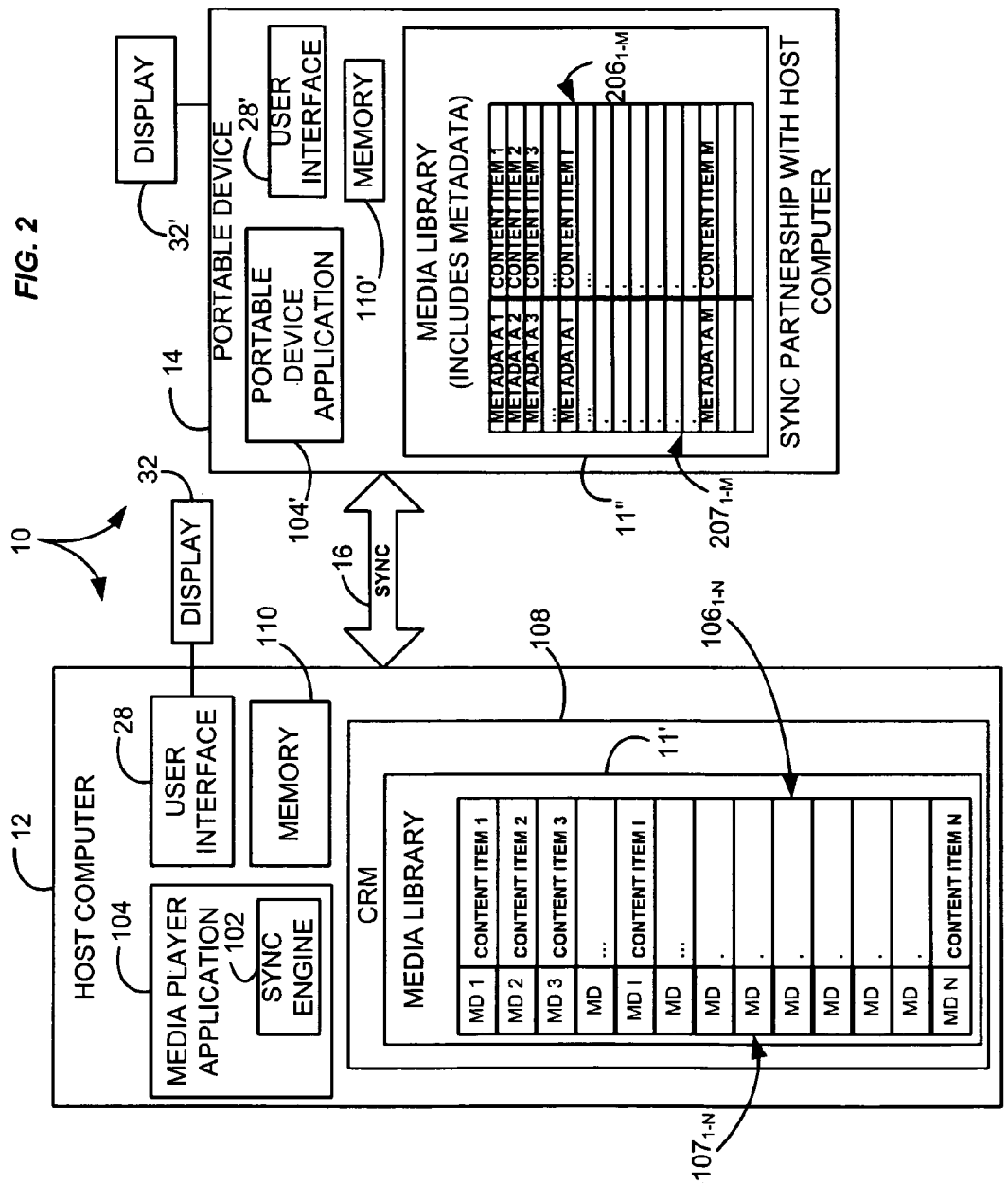
FIG. 2 is a simplified block diagram that shows various functional components of a host computer in a synchronization relationship with a portable device.

FIG. 2 illustrates a simplified functional block diagram of the exemplary arrangement 10 for packaging and transferring content items between the host computer 12 and the portable device 14. The host computer 12 includes a media organizing application, such as a media player application 104. Application 104 may also include a rendering filter or program that is configured to organize and/or render digital media. Executing media player application 104 in the illustrated arrangement allows a user to access one or more of a number of digital media files $106_{1-N}$ (shown as content item 1, content item 2, and so on) which may be part of a media library of content items 11' stored on any known or later developed computer-readable media 108. The media player application 104 may also be configured, if so desired, to access, retrieve, store, and display metadata associated with a media file for the user. Consequently, associated with digital media content items $106_{1-N}$ are metadata $107_{1-N}$.

Metadata is information about data. In the context of the content items, metadata involves information related to the specific contents of the digital media files $106_{1-N}$ and which is organized, stored, and/or rendered via media player application 104. Metadata includes, for example, one or more of album title, artist, performer, genre, description of content, and the like, and may be in the form of audio, video, text, graphics, images, and the like, similar to content items.

The host computer may also include computer-readable instructions (see element 218 of FIG. 11) for operating the media player application 104. The host computer may further include computer-readable instructions for operating a target device storage synchronization manager program module, also termed a synchronization engine 102, for the synchronization operation, a graphical user interface 28, and numerous other applications within the host computer 12.

The media player application 104 may include the graphical user interface 28 for displaying media files $106_{1-N}$ and/or organized metadata to the user on a display 32. The UI 28 may also be used to assist the user in transferring one or a plurality of the media files $106_{1-N}$ to a remote device such as the portable device 14 communicatively connected to the host computer 12 via synchronization connection or interface 16, respectively. The UI 28 may also display contents of the portable device directly.

The host computer 12 executes the synchronization engine 102, embodied on one or more processor-readable media (such as a computer storage or memory 110) and implemented as part of a multimedia software product, an operating system, or a dedicated multimedia appliance. One exemplary synchronization engine 102 provides a user-configurable model for facilitating automatic transfer of all or a subset of a user's digital collection to the target, portable device 14, from the source, host computer 12.

The synchronization or transfer interface 16 couples portable device 14 to host computer 12. This physical interface may be any known or later developed wired or wireless medium. Examples of a wired interface include USB, USB2, IEEE 1394 ("Firewire"), IEEE 1284 ("parallel" connection), RS-232 serial connections, and/or Ethernet, Token Ring, and similar networks. Examples of a wireless interface include Bluetooth; Infra-Red (IR); 802.11a, b, or g; GPRS, CDMA, EVDO, EDGE, or Wi-Fi (i.e., the Institute of Electrical and Electronics Engineers, IEEE 802.11 standards family) that enable connection to a wireless network or access point and other related wireless telephony data-transmission standards. In some implementations, the interface 16 may provide for data transfer over a short distance (e.g., measured in a few feet) or over a long distance (e.g., measured in miles).

The transfer from host computer 12 to portable device 14 (and vice versa) is termed "synchronization" or simply "sync". As the collection on the source device changes (e.g., as items are removed or added, and/or item priority changes), the subset of the collection which is stored on the target or portable device may also change with each synchronization.

The portable device 14 includes a portable device application 104', a memory 110', a user interface 28', and a media library for content items 11" which includes content items $206_{1-M}$ and their respective metadata $207_{1-M}$.

The portable device applications 104' provides the functionality of the portable device 14, and the media library 11' stores the content items and metadata placed thereon. The user interface 28', and the accompanying display 32', displays information such as media lists, playlists, track information, and the like.

As shown, the portable device 14 has set up a synchronization relationship or partnership with the host computer 12 through the synchronization or transfer interface 16. That is, the portable device 14 is registered with the host computer 12 and periodic synchronizations result in the media library, or a selected portion thereof, being placed onto the portable device 14. Manipulations of the files on one, such as additions, deletions, inclusion in a playlist, or the like, are reflected in the other upon synchronization.

Even portable devices that have not set up a partnership with a host computer may nevertheless connect to a host computer as a guest, either with the host computer for which a partnership is had or with another host computer, e.g., that of a friend.

Figure 3:
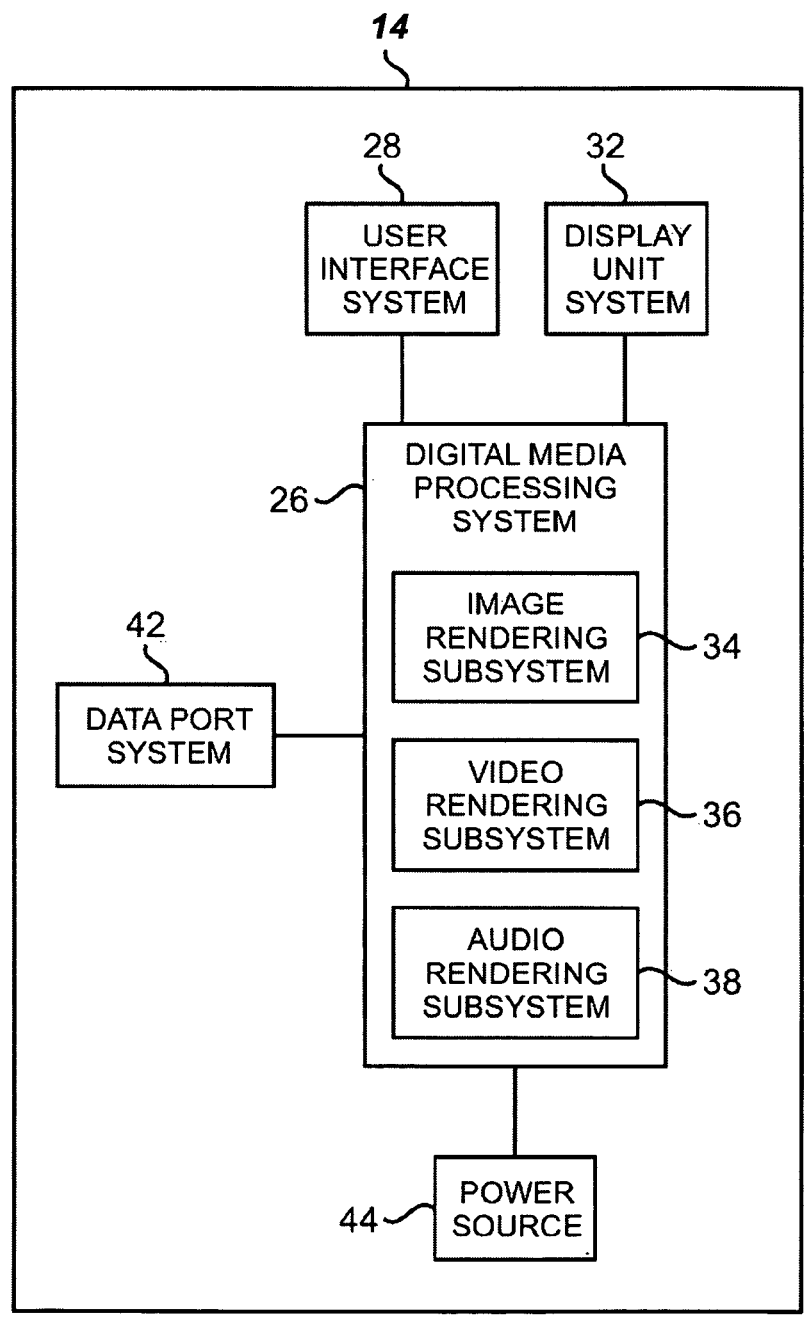
FIG. 3 is a simplified block diagram that shows various physical components of an illustrative example of a portable device.

FIG. 3 illustrates a simplified block diagram that shows various illustrative functional components of the portable device 14. The functional components include a digital media processing system 26, a user interface system 28, a display unit system 32, a power source system 44, and a data port system 42. The digital media processing system 26 further comprises an image rendering subsystem 34, a video rendering subsystem 36, and an audio rendering subsystem 38.

The digital media processing system 26 is the central processing system for the portable device 14 and provides functionality that is similar to that provided by the processing systems found in a variety of electronic devices such as host computers, mobile phones, PDAs, handheld game devices, digital recording and playback systems, and the like.

Some of the primary functions of the digital media processing system 26 may include receiving media content files downloaded to the player 14, coordinating storage of such media content files, recalling specific media content files on demand, and rendering the media content files into audio/visual output on the display for the user. Additional features of the digital media processing system 26 may also include searching external resources for media content files, coordinating DRM protocols for protected media content, and interfacing directly with other recording and playback systems.

As noted above, the digital media processing system 26 further includes three subsystems: the video rendering subsystem 36 which handles all functionality related to video-based media content files, which may include files in MPEG (Moving Picture Experts Group) and other formats; the audio rendering subsystem 38 which handles all functionality related to audio-based media content including, for example music in the commonly-utilized MP3 format and other formats; and the image rendering subsystem 34 which handles all functionality related to picture-based media content, including for example JPEG (Joint Photographic Experts Group), GIF (Graphic Interchange Format), and other formats. While each subsystem is shown as being logically separated, each may in fact share hardware and software components with each other and with the rest of the portable device 14, as may be necessary to meet the requirements of a particular implementation.

Functionally coupled to the digital media processing system 26 is the user interface system 28 through which the user may exercise control over the operation of the portable device 14. A display unit system 32 is also functionally coupled to the digital media processing system 26 and may comprise the display screen. Audio output through an earphone jack for playback of rendered media content may also be supported by display unit system 32. The display unit system 32 may also functionally support and complement the operation of the user interface system 28 by providing visual and/or audio output to the user during operation of the portable device 14.

The data port system 42 is also functionally coupled to the digital media processing system 26 and provides a mechanism by which the portable device 14 can interface with external systems in order to download media content. The data port system 42 may comprise, for example, a data synchronization connector port, a network connection (which may be wired or wireless), or other means of connectivity.

The portable device 14 has a power source system 44 that provides power to the entire device. The power source system 44 in this example is coupled directly to the digital media processing system 26 and indirectly to the other systems and subsystems throughout the player. The power source system 44 may also be directly coupled to any other system or subsystem of the portable device 14. Typically, the power source may comprise a battery, a power converter/transformer, or any other conventional type of electricity-providing power source, portable or otherwise.

Figure 4:
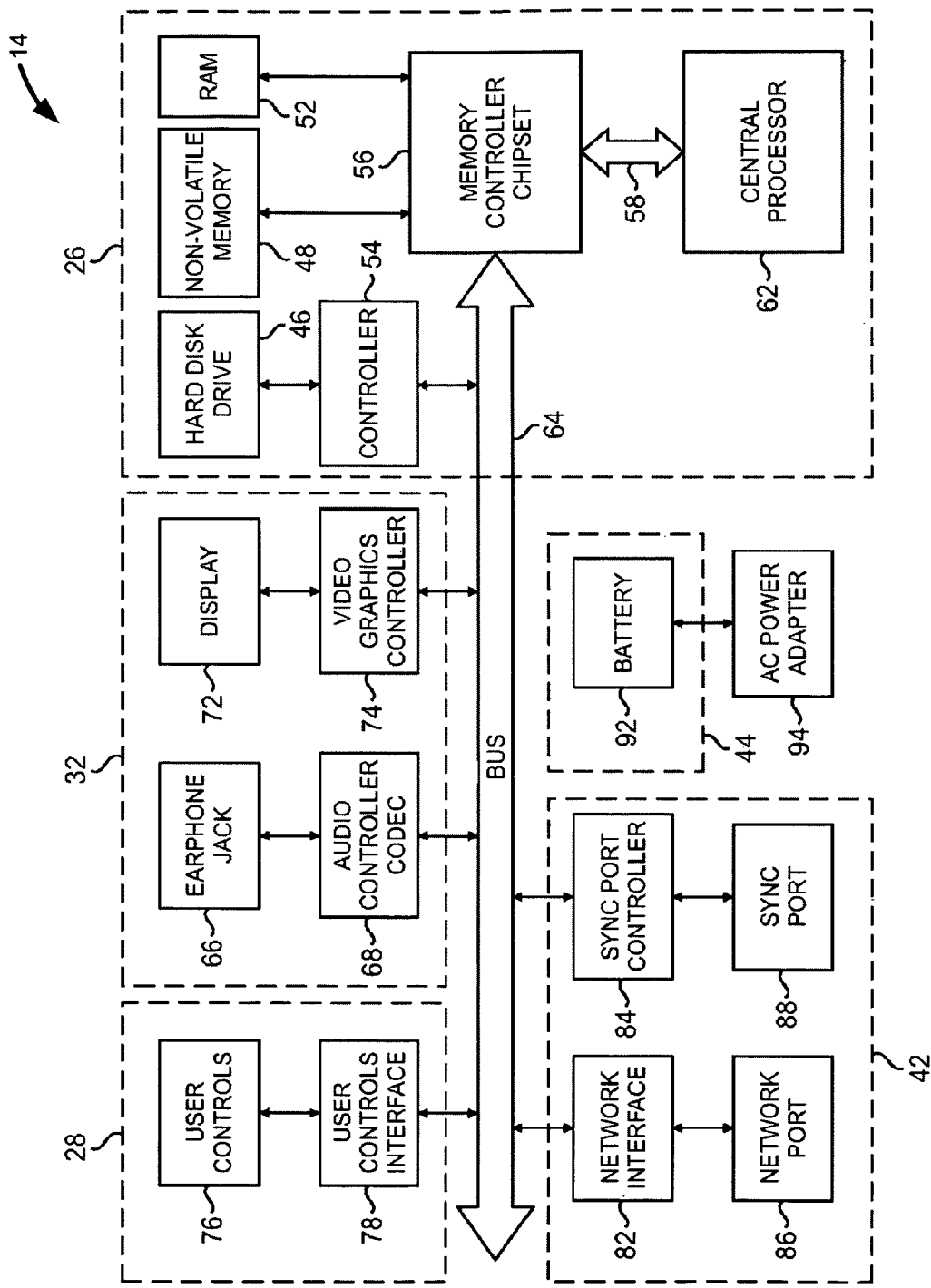
FIG. 4 is a more detailed block diagram of the various physical components of the portable device of FIG. 3.

FIG. 4 is a more detailed block diagram that shows various illustrative physical components of the portable device 14 based on the functional components shown in FIG. 3 (which are represented in FIG. 4 by dashed lines) and described in the accompanying text including the digital media processing system 26, the user interface system 28, the display unit system 32, the data port system 42, and the power source system 44. While each physical component is shown as included in only a single functional component in FIG. 4, the physical components may, in fact, be shared by more than one functional component.

The physical components include a central processor 62 coupled to a memory controller/chipset 56 through, for example, a multi-pin connection 58. The memory controller/chipset 56 may be, in turn, coupled to random access memory ("RAM") 52 and/or non-volatile memory 48 such as flash memory. These physical components, through connectivity with the memory controller/chipset 56, may be collectively coupled to a hard disk drive 46 via a controller 54, as well as to the rest of the functional component systems via a system bus 64.

In the power supply system 44, a rechargeable battery 92 may be used to provide power to the components using one or more connections (not shown). The battery 92, in turn, may also be coupled to an external AC power adapter 94 or receive power via the sync cable 60 when it is coupled to the host computer 12.

The display screen is associated with a video graphics controller 74. The video graphics controller will typically use a mix of software, firmware, and/or hardware, as is known in the art, to implement the GUI. Along with the earphone jack and its associated audio controller/codec 68, these components comprise the display unit system 32 and may be directly or indirectly connected to the other physical components via the system bus 64.

The user controls 76 are associated with a user control interface 78 in the user interface system 28 that implements the user control functionality that is used to support the interaction with the GUI as described above. A network port 86 and associated network interface 82, along with the sync port 88 and its associated controller 84, may constitute the physical components of the data port system 42. These components may also directly or indirectly connect to the other components via the system bus 64.

Figure 5:
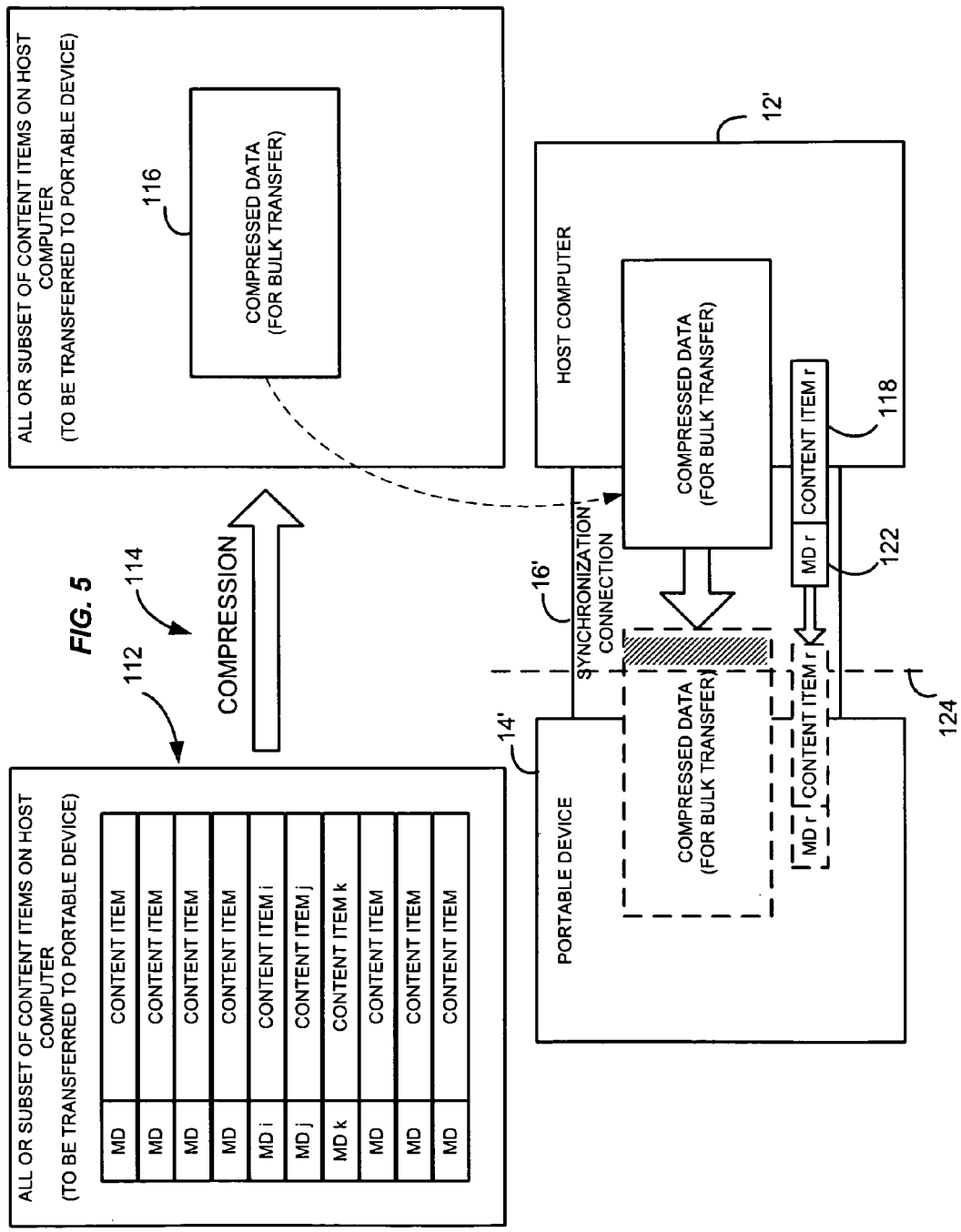
FIG. 5 illustrates a way to transfer files and metadata which employs a compression scheme.

Referring to FIG. 5, a schematic layout is shown for synchronizing content items to a portable device. A host computer has a number of content items stored thereon, and one or more of these content items include metadata ("MD"). All or a subset of these content items are to be transferred to a portable device, e.g., via a synchronization operation. The content items to be transferred are illustrated in FIG. 5 as a plurality 112 of content items and their associated metadata. The same undergo a compression operation 114 which results in a file containing compressed data 116. The host computer 12' takes the file with compressed data 116 and copies it to a portable device 14' through a synchronization connection 16'. FIG. 5 also shows the case where a single content item r (element 118) and its accompanying metadata (element 122) MD r are synchronized to the portable device 14'.

A disconnection in data transfer through synchronization connection 16' is shown in FIG. 5 by a dotted line 124. Upon the occurrence of this disconnection, only a portion of the file containing compressed data 116 has been transferred. The shaded portion remains untransferred. However, with many compression techniques, the received data cannot be interpreted unless the complete file has been received. Consequently, the received data is useless and, upon reconnection, the entire file 116 may be required to be sent again.

Figure 6:
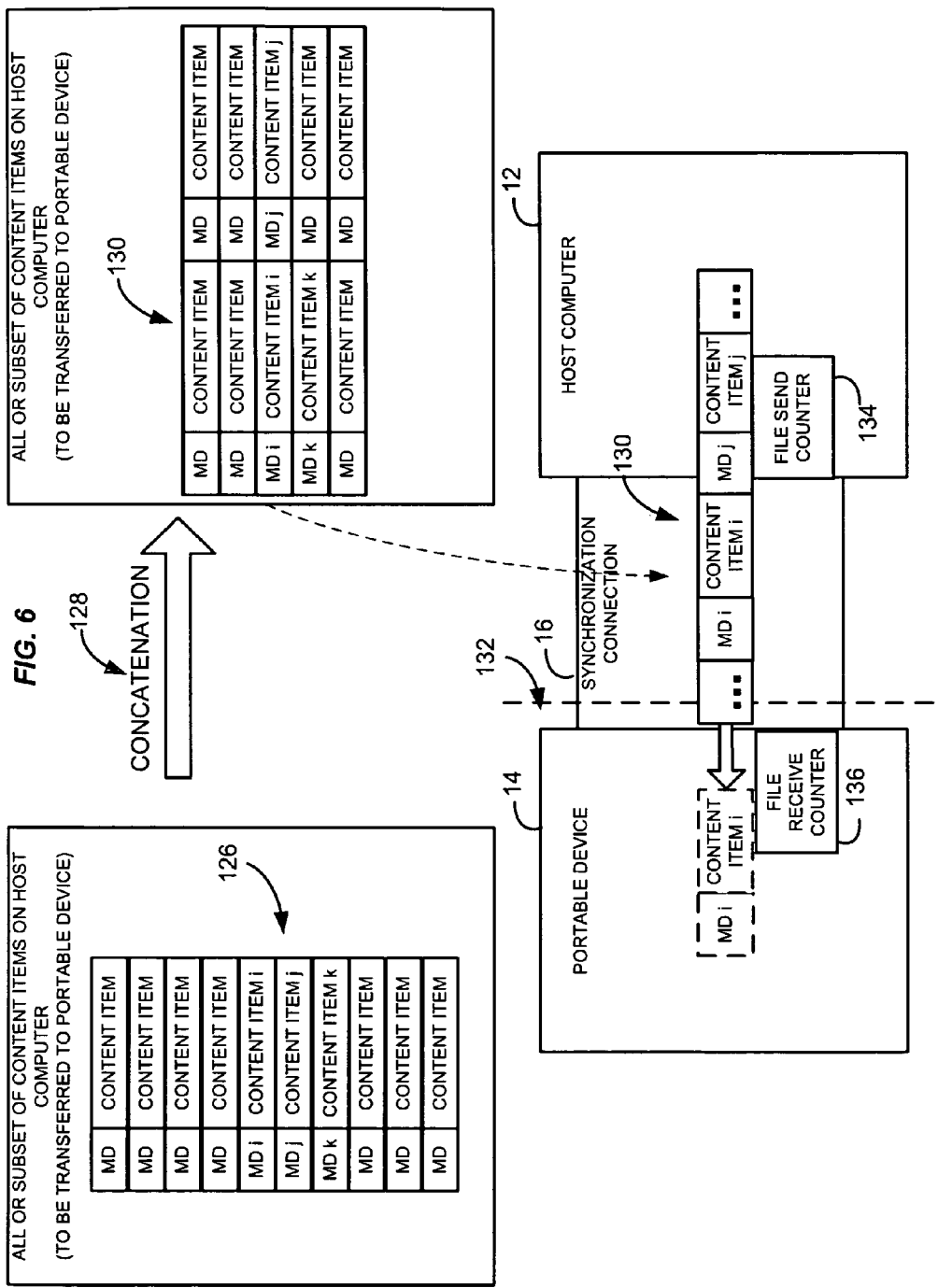
FIG. 6 illustrates an arrangement to transfer files and metadata which employs concatenation of content items.

Referring to FIG. 6, a schematic layout is shown for an arrangement for packaging and transferring content items for synchronization, e.g., to a portable device 14. A host computer 12 has a number of content items stored thereon, and one or more of these content items include metadata ("MD"). As before, a plurality 126 of these content items are to be transferred to a portable device 14, e.g., via a synchronization operation. In this arrangement, the plurality undergo a sequencing operation 114, such as a concatenation operation, which results in a file containing a series of concatenated content items 130. In this arrangement, each content item is prepended by its associated metadata. A host computer 12 takes the file with the concatenated content items 130 and copies it to a portable device 14 through a synchronization connection 16.

The concatenated content items 130 are sent in a bulk transfer to the portable device. That is, to the transfer layer, the string of concatenated content items may appear as one long transfer, rather than several smaller transfers. It is noted that in this sense "concatenated" does not necessarily mean that the content items are sent one after the other with no data in-between them. A file marker or other data may be placed between two or more content items, so long as the bulk transfer characteristic is maintained.

The prepended metadata may contain the file size, and thus the host computer and portable device may know where one file stops and thus where another begins. In another implementation, a file marker may be placed at the beginning and/or at the end of a file, and the occurrence of a file marker may mark the beginning and/or end of a file.

A disconnection in data transfer through the synchronization connection 16 is shown in FIG. 6 by dotted line 132. Upon the occurrence of this disconnection, only a portion of the file containing the series of concatenated content items 130 has been transferred. However, in this arrangement, a file send counter 134 has been keeping track of the content items being sent, e.g., by keeping track of the number of content items, of the number of bytes, or by another measure. For example, a content revision number may start at 1 once a first content item is sent, then may be changed or incremented to 2 once a second content item is sent, followed by 3, 4, etc. A corresponding file receive counter 136 may be disposed on the portable device 14 (client side) that keeps track via a similar measure of the content items received. As with the content revision number on the host computer side, a content revision number may start at 1 once a first content item is received, then may be changed or incremented to 2 once a second content item is received, followed by 3, 4, etc.

The content revision number may be incremented by transmitting or receiving the files as determined by the file sized described in the metadata, or by counting file markers.

Thus, at any given point in time, the file send counter 134 has a content revision number associated therewith, as does the file receive counter 136. If the two numbers match, then the same number of files has been sent as has been received. If the two numbers do not match, then a different number of files has been sent as has been received. In this way, the progress of the synchronization may be tracked without the need to send additional messages from the host computer to the portable device or vice-versa.

If a disconnection occurs, as at point 132, the transfer will cease. Upon recommencement of the synchronization and transfer operation, i.e., upon reconnection of the synchronization relationship, the content revision number in the file send counter 134 is compared to that in the file receive counter 136. If they differ, then the host computer 12 may query the portable device 14 to determine what content items the portable device 14 lacks. These missing content items may then be sent, the content revision numbers equated, and the transfer may begin again at the point 132 where it previously terminated.

Figure 7:
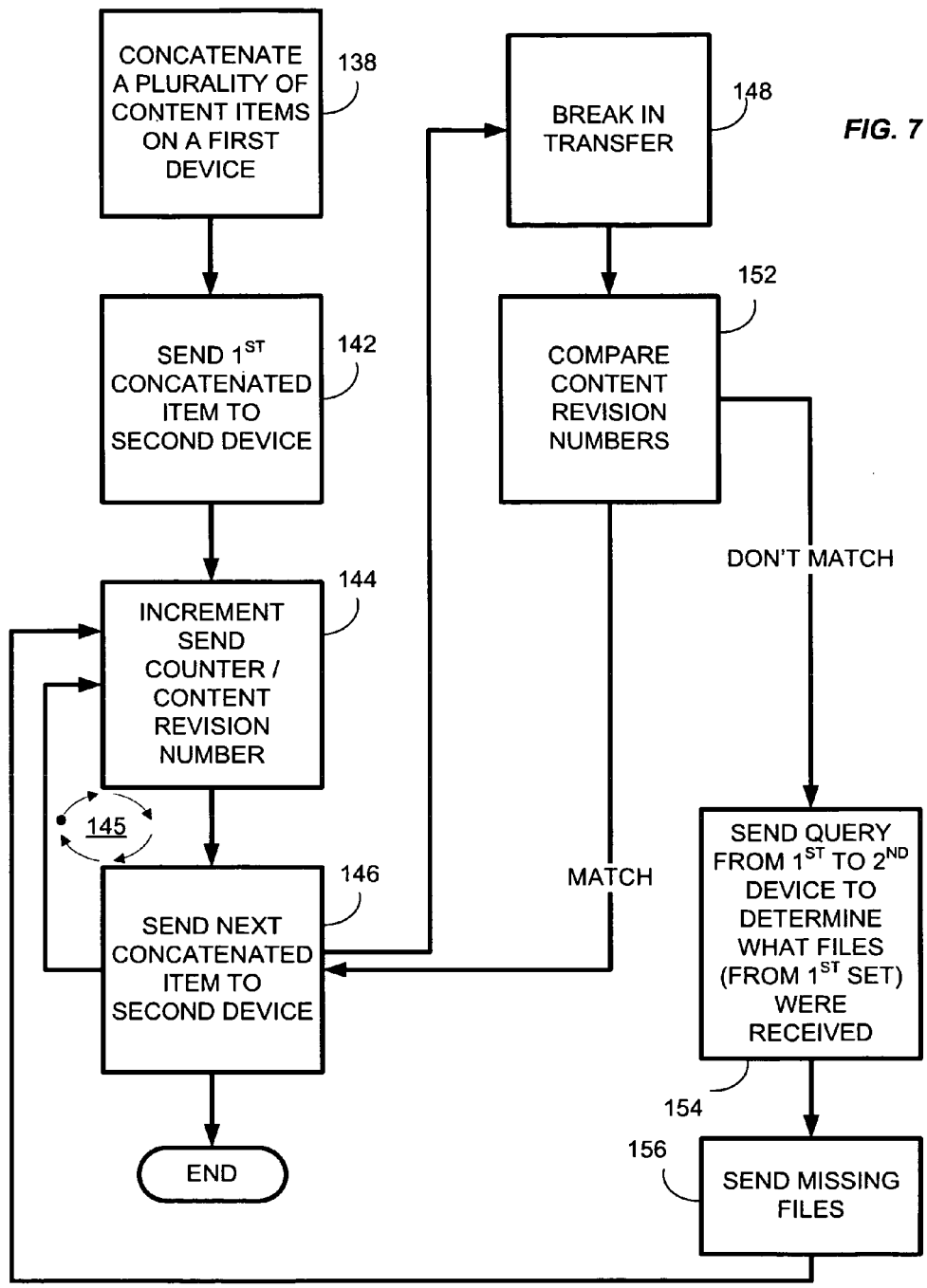
FIG. 7 is a flowchart for a method of transferring files and metadata which employs concatenation.

This arrangement is also shown in the flowchart of FIG. 7. A first step is to sequentially order a plurality of content items on a first device (step 138). This plurality constitutes those content items to be copied to the portable device. A next step is to send the first sequentially-ordered content item to the portable device (step 142). Upon the sending, a content revision number in the host computer is initiated and/or incremented (step 144). For example, a new counter may be initiated or an existing counter may be reset to zero or another starting value. The next sequentially-ordered content item may then be sent to the portable device (step 146). This loop 145 may then be repeated until there is either a disconnection between the portable device and the host computer (step 148) or until all the content items have been transferred.

If a disconnection occurs (step 148), upon reconnection, the content revision numbers of the file send counter and the file receive counter are compared (step 152). If they match, or otherwise correspond, then the transfer may continue (step 146). If the content revision numbers do not match, then a query may be sent (step 154) from the host computer to the portable device to enquire as to what files were received. This may be performed in a number of ways. For example, the content revision number on the portable device may be employed on its face for the number of content items received. For example, if the file send counter has a content revision number of 5 and the file receive counter has a content revision number of 3, then if the content revision number refers to a count of content items, two content items are missing from the recipient portable device and these two files should be re-sent. In this case, content items corresponding to the discrepancy between the content revision numbers may then be transferred (step 156), and the process continued at the disconnection point (step 146). Another way to determine the reason for a content revision number discrepancy is to compare a list of recently-sent content items with a list of recently-received ones. Other ways will be apparent as well.

Figure 8:
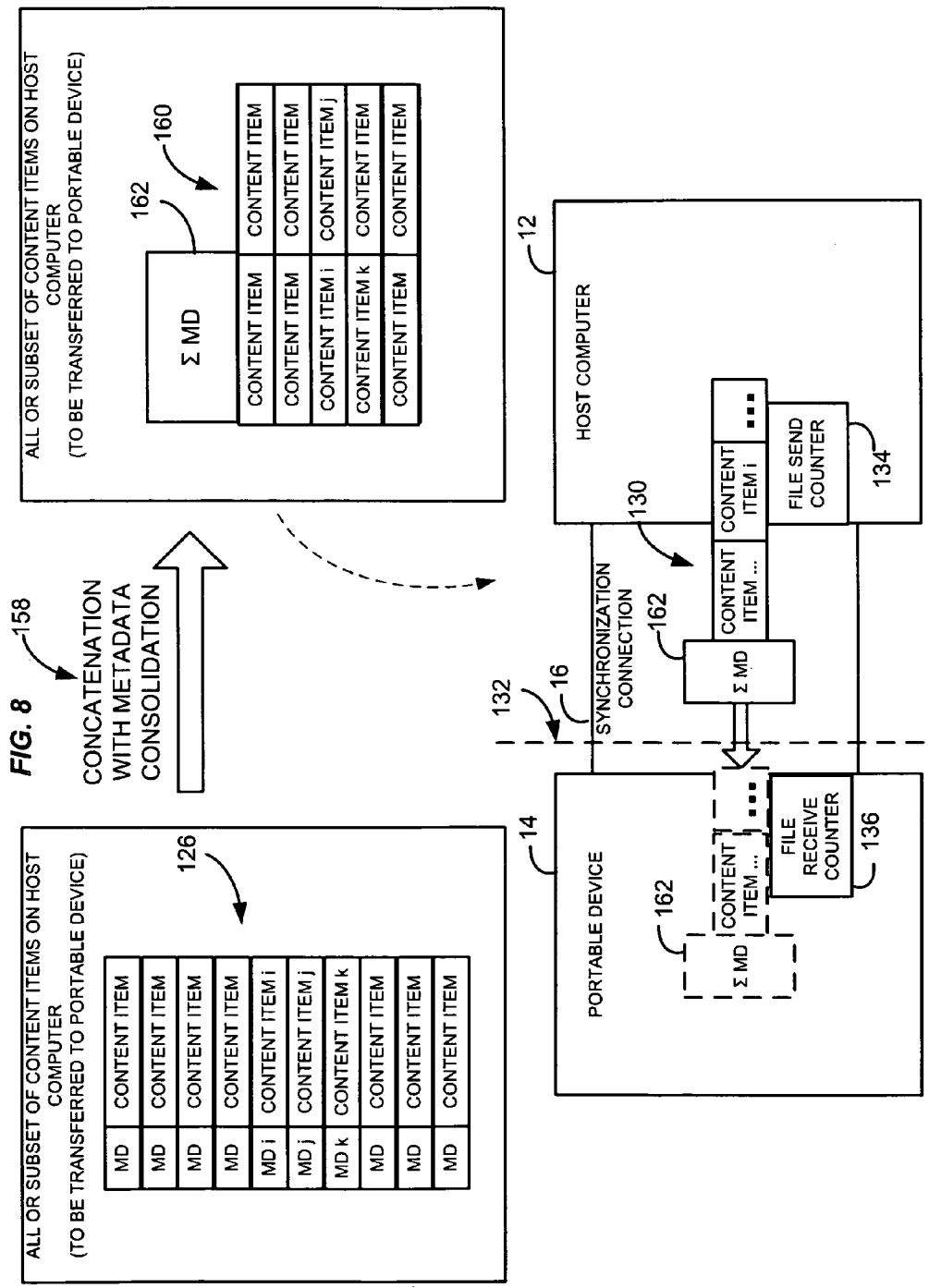
FIG. 8 illustrates an arrangement to transfer files and metadata which employs concatenation and consolidation of metadata.

Referring to FIG. 8, a schematic layout is shown for an arrangement for packaging and transferring content items for synchronization, e.g., to a portable device 14. In this arrangement, the plurality of content items 126 are subject to an operation 158 not only of sequential ordering but also of metadata consolidation. That is, a metadata consolidation file 162 is created which combines the metadata associated with the content items of the plurality. As the metadata has been combined into the metadata consolidation file 162, the individual metadata need not be in a header or appendix to the content item, and accordingly the plurality are shown as plurality 160, with no metadata appended or prepended. The metadata consolidation file, however, may be prepended to all the content items of the plurality. Prepending has the benefit that, upon receipt, and even before the content items have been received, operations may be taken on the metadata, e.g., associating the same with other content items stored on the portable device, retrieving or associating album artwork or the like, and so on. Other aspects of FIG. 8 are similar to that of FIG. 6, and are not repeated here.

Figure 9:
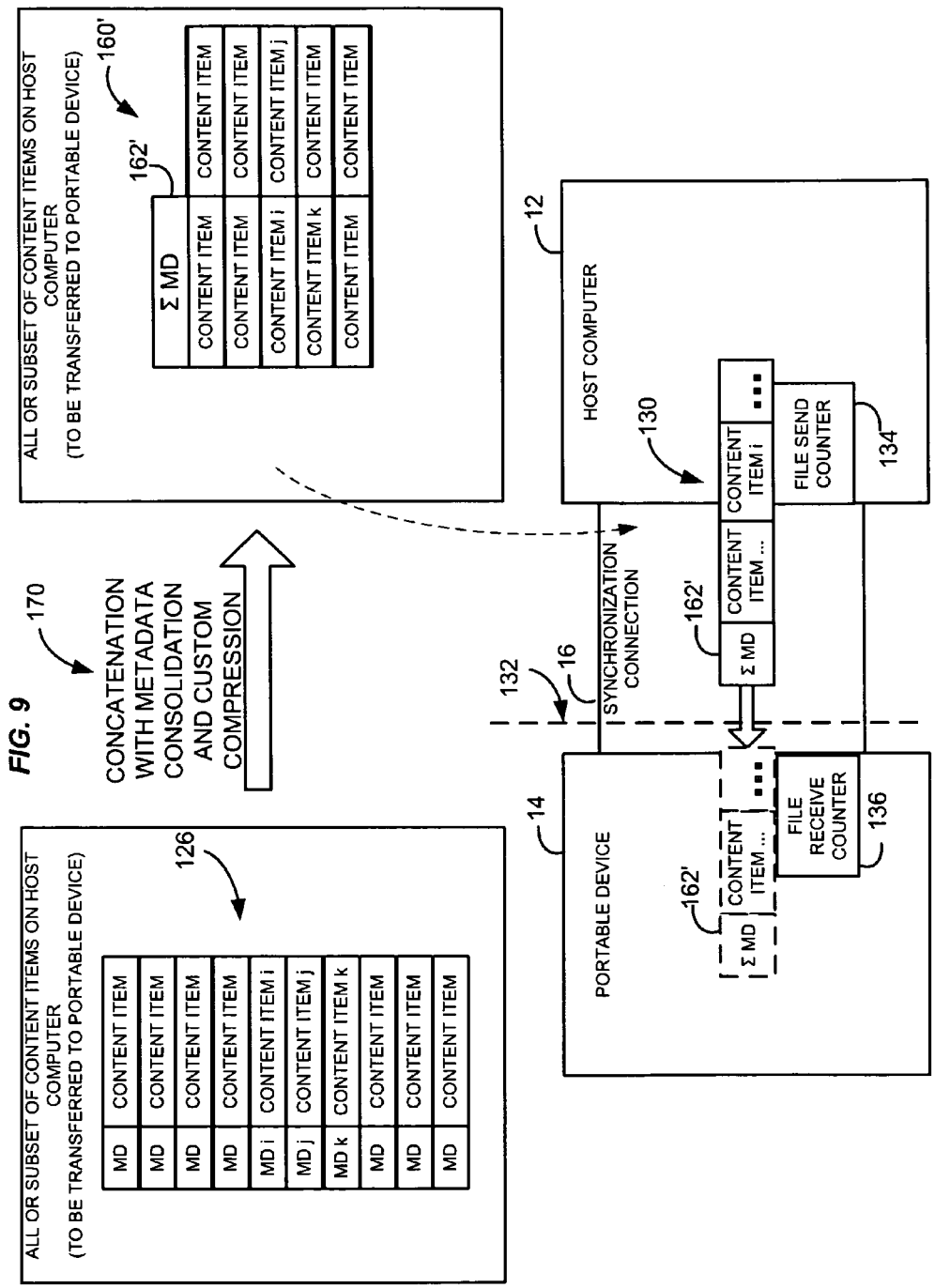
FIG. 9 illustrates an arrangement to transfer files and metadata which employs concatenation and consolidation as well as customized compression of metadata.

The arrangement of FIG. 9 is similar to the arrangement of FIG. 8, but in this case the metadata consolidation file 162 has been compressed via operation 170 to a compressed metadata consolidation file 162'. The file 162' may be prepended to the concatenated content items. In particular, it is noted that metadata for multiple files, especially those for known media types such as images, video, and audio, are often very similar and have patterns that may be exploited for compression. For example, most music files have an associated artist and album. And when transferring multiple music files, it is common that metadata is often repeated such as the same album title, same artist name, and the like. The arrangement of FIG. 9 may employ a custom compression algorithm, that is, one designed specifically for such files, to locate and compress based on known variables such as album, artist, and the like. For example, a reference to an album name may be used rather than the same album name for multiple content items. Other suitable variables on which compression may be based include image file name and suffix, video compression type, genre, and/or any other type of metadata.

In a separate step, which may be performed in addition to or instead of the custom compression step, the metadata consolidation file may be compressed using known standard compression techniques for video, images, and audio. Such a step removes common patterns in the metadata, e.g., across the metadata properties. For example, one song may be by "Chemical Brothers" while another may be from the "Chemically Imbalanced" album, and the common data may be reduced in a compression step in known fashion.

The above description is generally with respect to the metadata consolidation file, though the content items may undergo compression as well. However, it is noted that, in many cases, multimedia data is already highly compressed, and thus further compression will often not appreciably reduce the file size.

Other aspects of FIG. 9 are similar to that of FIGS. 6 and 8, and are not repeated here.

Figure 10:
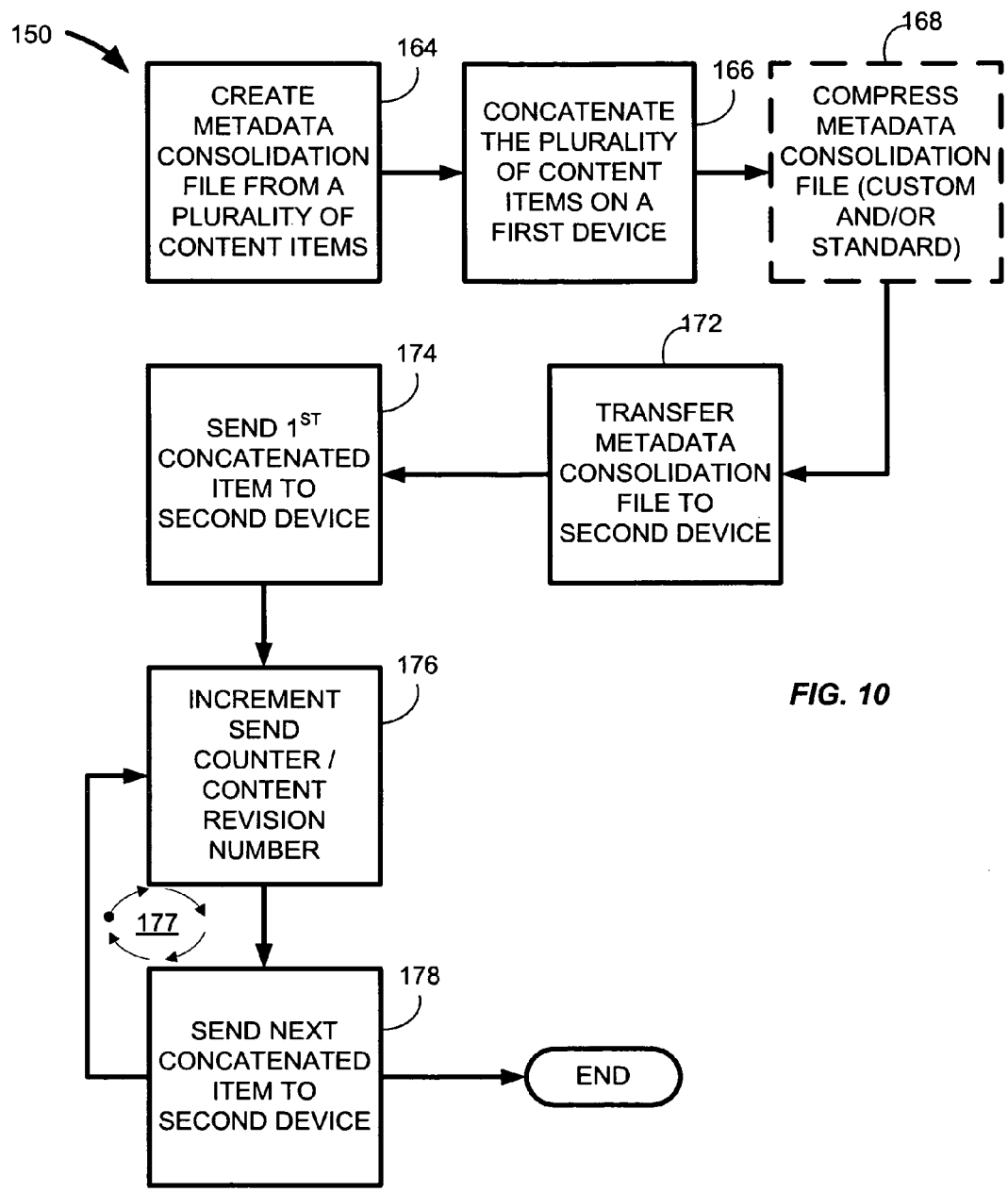
FIG. 10 is a flowchart for a method of transferring files and metadata which employs concatenation, consolidation of metadata, as well as compression of metadata.

FIG. 10 shows a flowchart 150 pertaining to the arrangements of FIGS. 8 and 9. First, a metadata consolidation file is created from a plurality of content items (step 164). The content items themselves are sequentially ordered on the first device, e.g., the host computer. The metadata consolidation file is then compressed, using custom and/or standard techniques (step 168). The metadata consolidation file is then sent to the second device, e.g., a portable device (step 172). By sending the metadata consolidation file ahead of the content files, operations may be carried out on the metadata during the time the content items are being transferred. Prepended metadata allows that metadata to be applied to content item files as they are received, and the same may be stored for future use. For example, album art may be retrieved or associated with the content item, if the same is resident on the portable device. Other steps may also be performed.

A next step is to send the first content item to the portable device (step 174). Upon the sending, a content revision number in the host computer is initiated and/or changed, e.g., incremented (step 176). The next concatenated content item may then be sent to the portable device (step 178). The loop 177 may then be repeated until there is either a disconnection between the portable device and the host computer or until all the content items have been transferred. In the event of a disconnections, steps as shown in FIG. 7 may be followed.

Figure 11:
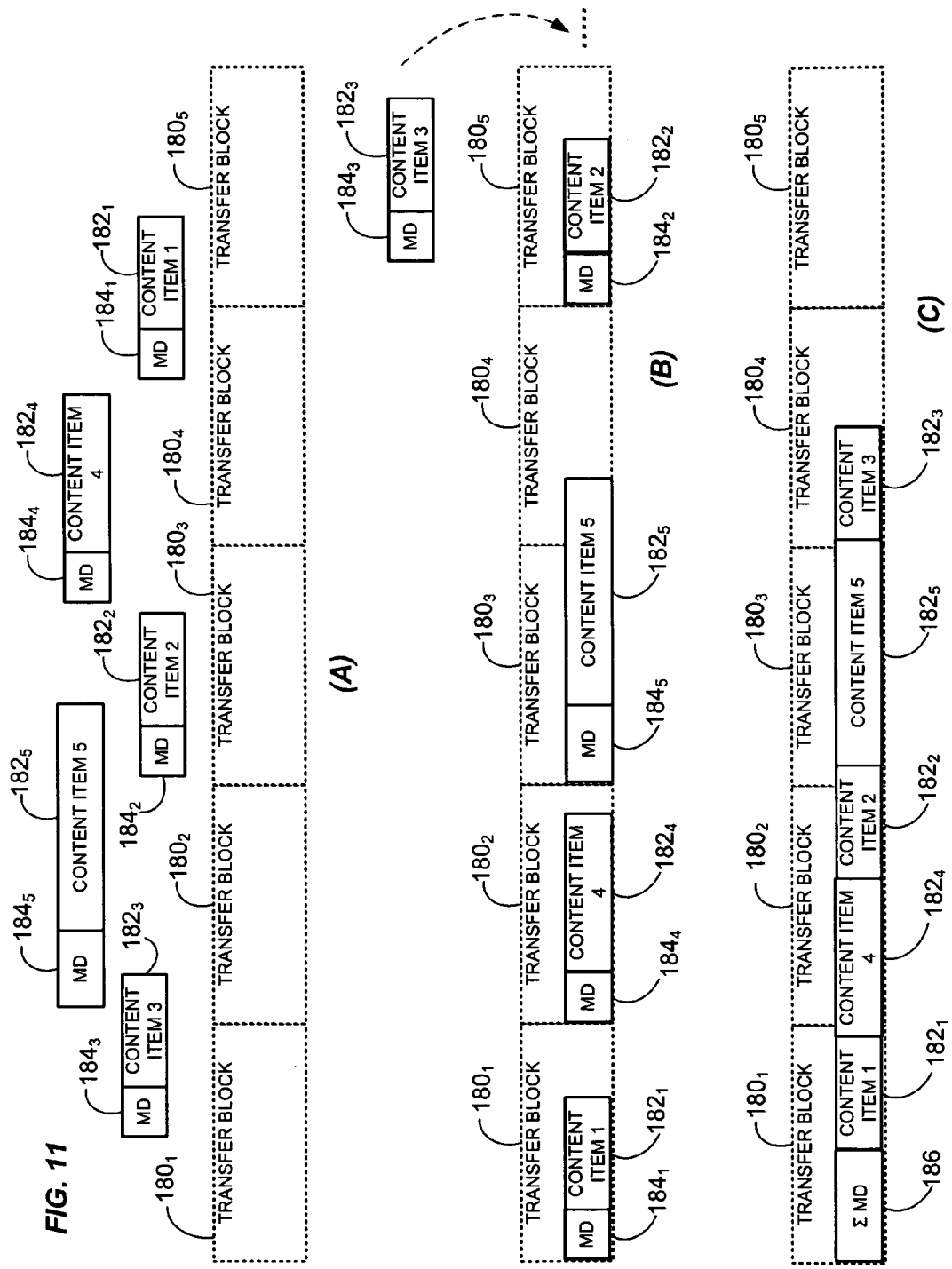
FIG. 11 is a simplified diagram comparing a prior way of transferring content files with one aspect of the arrangement, showing how fewer transfer blocks are required with the arrangement.

FIG. 11 illustrates a prior way of transferring or synchronizing content items compared with a way according to one implementation of the arrangement. In FIG. 11, a series of five transfer blocks $180_i$ are illustrated. These are generally blocks of constant size, e.g., 512 k, in which content items are transferred. A set of five content items $182_i$ with accompanying metadata $184_i$ are also shown. In FIG. 11(A), the five content items $182_i$ and their metadata $184_i$ have not yet been organized into the five displayed transfer blocks. FIG. 11(B) shows a prior way of so organizing these. Each content item $182_i$ is organized into its own transfer block $180_i$ with metadata $184_i$ prepended. Note that the metadata is to the left of the content item as the data flow is presumed to be to the left. As may be seen, the content item 3 (element $182_3$) and its accompany metadata $184_3$ are not able to fit in the five transfer blocks, and one or more additional transfer blocks must be used. FIG. 11(C) shows a way of organizing the metadata and content items into transfer blocks using an implementation of the arrangement. A consolidated metadata file 186 prepends the content files, which are then organized as concatenated content files. A significantly fewer number of transfer blocks are required. To locate the end of a given content item file, demarcation points may be obtained by use of file markers or by knowing, from the consolidation metadata file 186, how large each content item file is and then counting bytes.

Example

Figure 12:
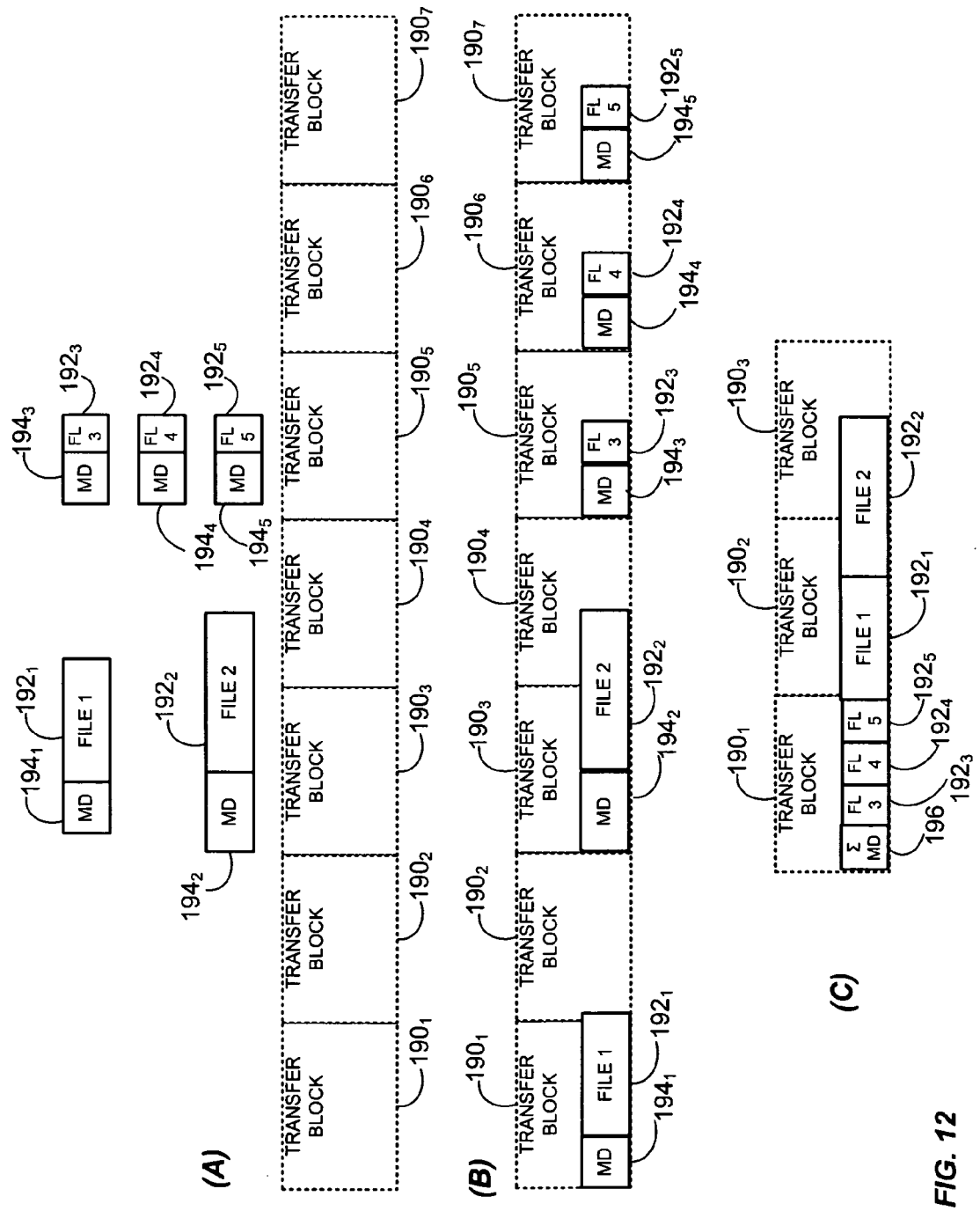
FIG. 12 is a simplified diagram comparing a prior way of transferring content files with one aspect of the arrangement, demonstrating for the example described below how fewer transfer blocks are required with the arrangement.

FIG. 12 illustrates a specific example. In this example, a transport is presumed that is optimized for bulk transfer blocks $190_{1-7}$ of 512 kB. As indicated in FIG. 12(A), the following files are to be transferred by the transfer blocks $190_{1-7}$.

File 1: (Content Item $192_1$)
Metadata $194_1$
Size: 513 kB
Album name: Album 1
Artist name: Artist 1
Track name: Track 1
File 2: (Content Item $192_2$)
Metadata $194_2$
Size: 580 kB
Album name: Album 1
Artist name: Artist 1
Track name: Track 2
File 3: (Content Item $192_3$)
Metadata $194_3$
Size: 10 kB
File name: PICT7834.jpg
File 4: (Content Item $192_4$)
Metadata $194_4$
Size: 10 kB
File name: PICT3862.jpg
File 5: (Content Item $192_5$)
Metadata $194_5$
Size: 10 kB
File name: PICT9816.jpg In the example of FIG. 12, to transfer all of these files using typical means, seven transfer blocks would be required, since files 1 and 2 each need two blocks. One possible way to transfer these using typical means is shown in FIG. 12(B). However, using the arrangements disclosed here, an example of which is shown in FIG. 12(C), this number may be reduced to only three blocks total. Additionally, the commonality between the album and the artist metadata in files 1 and 2 may result in the album and artist metadata only being sent once. Similarly, the "PICT" portion in files 3-5 may be reused, i.e., reduced with compression based on the "PICT" pattern. Thus, the metadata may not only be consolidated but also compressed to achieve a highly-optimized transfer scheme.

The arrangements described here provide a feature-rich way to transfer files and metadata for synchronization. Numerous variations will be apparent. For example, the term "host computer" should be construed to be much more than just desktop or laptop computers; the term may encompass any computing device. In the same way, a portable device may include any type of device on which media content items may be consumed, and the term is not limited to simply mp3 players. That is, the principles of the present arrangement may be generally applied to other devices such as, for example, mobile phones, PDAs, smart phones, handheld game devices, ultra-mobile computers, devices including various combinations of the functionalities provided herein, and the like. While the arrangement has been primarily described using USB wired connections, any sort of wired or wireless connection may be employed between a host computer and a portable device. While the arrangement has been primarily described in the context of transferring files and metadata from a host computer to a portable device, it will be clear that the arrangement may also be used in the context of transferring files and metadata from a host computer to another host computer, from a portable device to a host computer, or from one portable device to another. While the above description has discussed a metadata consolidation file as being sent prior to a string of concatenated content items, the metadata consolidation file may also be sent subsequent, e.g., appended, to the string of concatenated content items. While the above description has discussed sending one bulk transfer of concatenated items, it should be noted that a single bulk transfer may be split up into several smaller bulk transfers if required by transfer or space constraints on the device. For example, ten content items may be concatenated together and sent, and then another ten content items may be concatenated together and sent. This might be necessary if there are limitations on the host computer or portable device regarding maximum transfer size of a single bulk transfer. As one example, a portable device may have a maximum single transfer size of 4 GB. Therefore, a concatenation may only include up to 4 GB of content. But multiple 4 GB transfers may be employed to transfer more, e.g., 8 GB. In the 8 GB example, while two 4 GB transfers may be slower than concatenating all 8 GB files together, it is still faster than sending each file individually.

The above description has focused on portable devices, e.g., portable media players, synchronized with host computers. Such portable media players may include, e.g., Zune® devices available from Microsoft Corporation of Redmond, Wash., as well as other such devices. Synchronization applications may include, e.g., Windows Media Player™, iTunes®, Zune®, or the like. In such applications, the primary file types are music files, video files, and photos. However, the arrangement may be employed in other scenarios as well, using other types of files, and may employ other sending and synchronization mechanisms.

Figure 13:
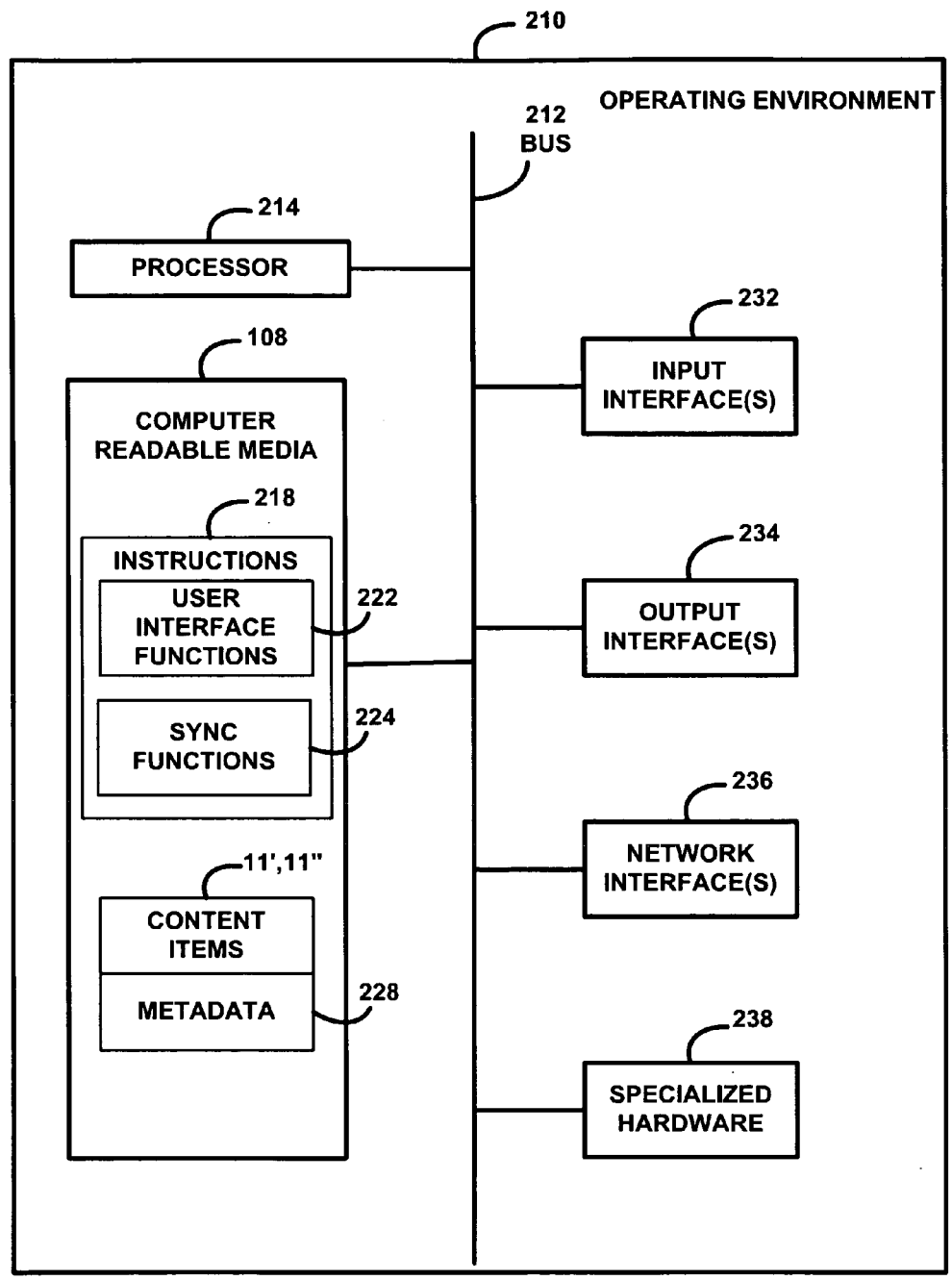
FIG. 13 is a simplified functional block diagram of an exemplary configuration of an operating environment in which the arrangement for packaging and bulk transfer of content items for synchronization may be implemented or used.

FIG. 13 is a block diagram of an exemplary configuration of an operating environment 210 in which all or part of the arrangements and/or methods shown and discussed in connection with the figures may be implemented or used. For example, the operating environment may be employed in either the portable device 14, the host computer 12, or both. Operating environment 210 is generally indicative of a wide variety of general-purpose or special-purpose computing environments, and is not intended to suggest any limitation as to the scope of use or functionality of the arrangements described herein.

As shown, operating environment 210 includes processor 214, computer-readable media 108, and computer-executable instructions 218. One or more internal buses 212 may be used to carry data, addresses, control signals, and other information within, to, or from operating environment 210 or elements thereof.

Processor 214, which may be a real or a virtual processor, controls functions of the operating environment by executing computer-executable instructions 218. The processor may execute instructions at the assembly, compiled, or machine-level to perform a particular process.

Computer-readable media 108 may represent any number and combination of local or remote devices, in any form, now known or later developed, capable of recording, storing, or transmitting computer-readable data, such as computer-executable instructions 218 which may in turn include user interface functions 222, synchronization functions 224, and content items 11', 11" and metadata 228. In particular, the computer-readable media 108 may include storage media, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; a paper tape; a punch card; or any combination thereof. The computer-readable media may also include transmission media and data associated therewith. Examples of transmission media/data include, but are not limited to, data embodied in any form of wireline or wireless transmission, such as packetized or non-packetized data carried by a modulated carrier signal.

Computer-executable instructions 218 represent any signal processing methods or stored instructions. Generally, computer-executable instructions 218 are implemented as software components according to well-known practices for component-based software development, and are encoded in computer-readable media. Computer programs may be combined or distributed in various ways. Computer-executable instructions 218, however, are not limited to implementation by any specific embodiments of computer programs, and in other instances may be implemented by, or executed in, hardware, software, firmware, or any combination thereof.

Input interface(s) 232 are any now-known or later-developed physical or logical elements that facilitate receipt of input to operating environment 210.

Output interface(s) 234 are any now-known or later-developed physical or logical elements that facilitate provisioning of output from operating environment 210.

Network interface(s) 236 represent one or more physical or logical elements, such as connectivity devices or computer-executable instructions, which enable communication between operating environment 210 and external devices or services, via one or more protocols or techniques. Such communication may be, but is not necessarily, client-server type communication or peer-to-peer communication. Information received at a given network interface may traverse one or more layers of a communication protocol stack.

Specialized hardware 238 represents any hardware or firmware that implements functions of operating environment 210. Examples of specialized hardware include encoders/decoders, decrypters, application-specific integrated circuits, clocks, and the like.

The methods shown and described above may be implemented in one or more general, multi-purpose, or single-purpose processors.

Functions/components described herein as being computer programs are not limited to implementation by any specific embodiments of computer programs. Rather, such functions/components are processes that convey or transform data, and may generally be implemented by, or executed in, hardware, software, firmware, or any combination thereof.

It will be appreciated that particular configurations of the operating environment may include fewer, more, or different components or functions than those described. In addition, functional components of the operating environment may be implemented by one or more devices, which are co-located or remotely located, in a variety of ways.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

What is claimed is:

1. A computer-readable storage medium, not comprising a propagated data signal, containing instructions which, when executed by one or more processors disposed in an electronic device, implement a method for packaging and transferring a plurality of content items from a first device to a second device to synchronize the content items such that at least a subset of content items on the first device corresponds to content items on the second device, the method comprising the steps of:
   a. on a first device on which content items are stored, concatenating a plurality of the content items;
   b. transmitting the concatenated content items in a sequence for reception by a second device, wherein each of the plurality of content items is associated with a metadata item, and wherein the concatenating a plurality of content items further comprises placing a metadata consolidation file, containing data pertaining to the metadata items associated with the plurality, prior to the concatenating content items in the sequence;

c. such that before, during, or after a content item is sent to the second device, but before a next content item is sent to the second device, further comprising changing a content revision number on the first device associated with the concatenated plurality of content items, wherein the content revision number is changed based upon the transmission of a content item of a predetermined file size, as described in prepended metadata, to the second device, or by the occurrence of a file marker, and wherein upon a disconnection in the transmitting step, the plurality of content items is divided into a first set and a second set, wherein the first device has previously transmitted the first set of content items for reception by the second device prior to the disconnection, and further comprising the step of:

d. upon reconnection, comparing the content revision number associated with the first device with a content revision number associated with the second device, wherein if the content revision number associated with the first device does not correspond to the content revision number associated with the second device, then further comprising the step of sending a query from the first device for reception by the second device requesting information about the content items from the first set received on the second device;

further comprising compressing the metadata consolidation file, wherein the compression uses both a custom mechanism that takes into account predictable commonalities inherent in metadata for multimedia files and also standard compression techniques.

2. The medium of claim 1, in which the changing includes incrementing.

3. The medium of claim 1, in which the first device is selected from the group consisting of: a server and a host computer.

4. The medium of claim 1, further comprising compressing the metadata consolidation file, in which the compression is based on a known category of metadata in the metadata consolidation file.

5. The medium of claim 4, in which the known category of metadata includes a category selected from the group consisting of: album, artist, genre, file type, file name, series, and combinations thereof.

6. The medium of claim 1, further comprising compressing the metadata consolidation file, in which the compression is based on a standard variety of image compression, audio compression, or video compression, or combinations thereof.

7. The medium of claim 1, in which if the content revision number associated with the first device corresponds to the content revision number associated with the second device, then further comprising transmitting the second set of content items from the first device for reception by the second device.

8. The medium of claim 1, in which the content revision number corresponds to the number of content items sent.

9. A computer-readable storage medium, not comprising a propagated data signal, containing instructions which, when executed by one or more processors disposed in an electronic device, implement a method for receiving content items sent from a first device and received on a second device, to synchronize the content items such that at least a subset of content items on the first device corresponds to content items on the second device, the method comprising the steps of:

a. from a first device, receiving a portion of a concatenated plurality of content items in a sequence on a second device;

b. such that, after each content item is received, changing a content revision number associated with the plurality of content items, c. wherein the content revision number is changed based upon the reception of a content item of a predetermined file size, as described in metadata prepended or appended to its associated content item, at the second device, or by the occurrence of a file marker, wherein each content item is associated with a metadata item, and in which the step of receiving a portion of a concatenated plurality of content items further comprises receiving a metadata consolidation file placed at the beginning of the sequence; and wherein upon a disconnection in the receiving step, the plurality of content items is divided into a first set and a second set, wherein first device has previously transmitted the first set of content items for reception by the second device prior to the disconnection, and further comprising the step of:

d. upon reconnection, comparing the content revision number associated with the first device with a content revision number associated with the second device, wherein if the content revision number associated with the first device does not correspond to the content revision number associated with the second device, then further comprising receiving a query from the first device on the second device requesting information about the content items from the first set received on the second device;

further comprising compressing the metadata consolidation file, wherein the compression uses both a custom mechanism that takes into account predictable commonalities inherent in metadata for multimedia files and also standard compression techniques.

10. The medium of claim 9, in which the changing includes incrementing.

11. The medium of claim 9, in which the metadata consolidation file is compressed using a compression technique based on a known type of metadata contained in the metadata consolidation file, and further comprising decompressing the metadata consolidation file.

12. The medium of claim 9, in which if the content revision number associated with the first device corresponds to the content revision number associated with the second device, then further comprising receiving the second set of content items from the first device on the second device.

* * * * *